United States Patent
Lin

(10) Patent No.: US 10,643,622 B2
(45) Date of Patent: May 5, 2020

(54) IDENTITY INFORMATION MATCHING SYSTEM AND METHOD, AND USER DEVICE

(71) Applicant: HON HAI PRECISION INDUSTRY CO., LTD., New Taipei (TW)

(72) Inventor: Jung-Yi Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 164 days.

(21) Appl. No.: 15/884,284

(22) Filed: Jan. 30, 2018

(65) Prior Publication Data

US 2019/0189130 A1    Jun. 20, 2019

(30) Foreign Application Priority Data

Dec. 15, 2017  (TW) .............................. 106144286 A

(51) Int. Cl.
*G10L 17/22* (2013.01)
*G10L 17/00* (2013.01)
*G10L 25/78* (2013.01)
*G10L 15/22* (2006.01)
*G10L 15/24* (2013.01)
*G10L 15/18* (2013.01)

(52) U.S. Cl.
CPC .......... *G10L 17/22* (2013.01); *G10L 15/1815* (2013.01); *G10L 15/22* (2013.01); *G10L 15/24* (2013.01); *G10L 17/005* (2013.01); *G10L 25/78* (2013.01); *G10L 15/1822* (2013.01)

(58) Field of Classification Search
CPC ................................ G10L 17/22; G10L 15/22
See application file for complete search history.

(56) References Cited

U.S. PATENT DOCUMENTS

| | | | | |
|---|---|---|---|---|
| 8,593,501 | B1 * | 11/2013 | Kjeldaas | .................. H04N 7/15 |
| | | | | 348/14.01 |
| 10,304,458 | B1 * | 5/2019 | Woo | ........................ G10L 15/26 |
| 2014/0123253 | A1 * | 5/2014 | Davis | .................... G06F 21/316 |
| | | | | 726/6 |
| 2015/0382047 | A1 * | 12/2015 | Van Os | .................... G06F 16/73 |
| | | | | 725/38 |
| 2017/0068512 | A1 * | 3/2017 | Cho | ........................ G06F 3/005 |
| 2019/0028759 | A1 * | 1/2019 | Yuan | ....................... G10L 17/22 |
| 2019/0034735 | A1 * | 1/2019 | Cuban | ................ G06K 9/00771 |
| 2019/0102606 | A1 * | 4/2019 | Nowozin | ........... G06K 9/00268 |

FOREIGN PATENT DOCUMENTS

| | | |
|---|---|---|
| TW | 201403498 A | 1/2014 |
| TW | 201741921 A | 12/2017 |

* cited by examiner

*Primary Examiner* — Douglas Godbold
(74) *Attorney, Agent, or Firm* — ScienBiziP, P.C.

(57) ABSTRACT

A method for identifying and associating information with particular individuals to render same sufficient for registration and login purposes by a specific individual, used in an identity information matching system, includes identifying individuals in scene, recording voices in the scene, identifying individual voices and words and semantics used, and determining an action from a target individual given in response to a trigger voice emanating from the individual voices. The trigger voice and words and semantics associated with the responding target individual are recorded. An identity information matching system and a user device processing the identity information matching method are also disclosed.

14 Claims, 4 Drawing Sheets

IDENTITY INFORMATION MATCHING SYSTEM AND METHOD, AND USER DEVICE

FIELD

The subject matter herein generally relates to big data analyzing technologies, and particularly relates to an identity information matching system, an identity information matching method, and a user device.

BACKGROUND

Users are generally required to manually input user identity information, specially user name to register for social media software, such as Wechat and QQ. In some occasions, such as membership card registration and employment, the user also needs to manually fill in an identity information form.

BRIEF DESCRIPTION OF THE DRAWINGS

Implementations of the present technology will now be described, by way of example only, with reference to the attached figures.

DETAILED DESCRIPTION

Figure 1:
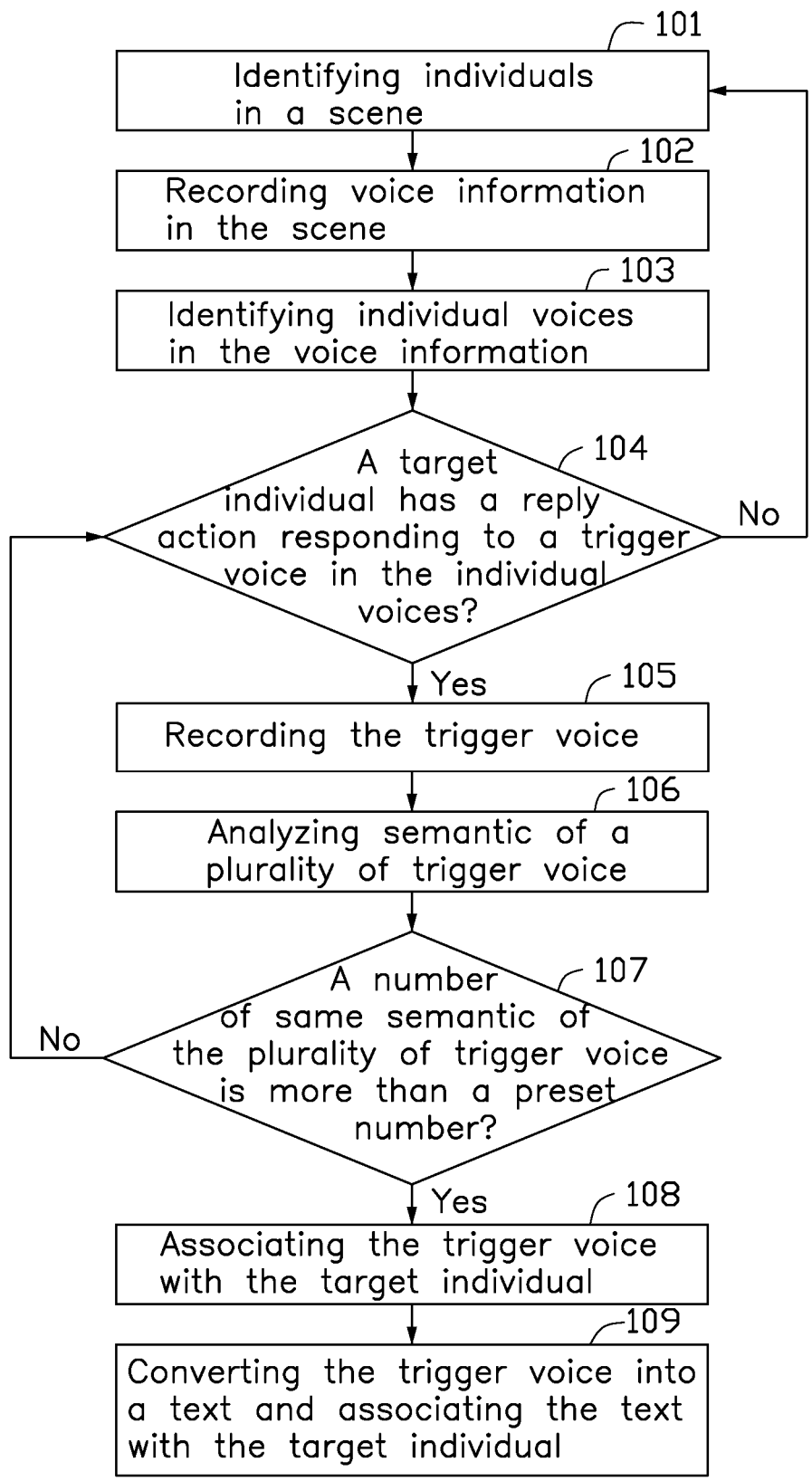
FIG. 1 is a flow diagram of an exemplary embodiment of an identity information matching method.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

Several definitions that apply throughout this disclosure will now be presented.

The term "comprising" means "including, but not necessarily limited to"; it specifically indicates open-ended inclusion or membership in a so-described combination, group, series, and the like.

FIG. 1 illustrates an identity information matching method in accordance with an exemplary embodiment. The identity information matching method can obtain and record identity information through analyzing individual behavior. The method is provided by way of example, as there are a variety of ways to carry out the method. The exemplary method described below can be carried out using the configurations illustrated in FIGS. 3-4, for example, and various elements of these figures are referenced in explaining the example method. Each block shown in FIG. 1 represents one or more processes, methods, or subroutines, carried out in the example method. Furthermore, the illustrated order of blocks is illustrative only and the order of the blocks can change. Additional blocks can be added or fewer blocks may be utilized, without departing from the present disclosure. The example method can begin at block 101.

At block 101, individuals in a scene are identified. The scene is a fixed activity space, such as meeting room, supermarket, laboratory, classroom, dining room, and shopping mall. The individuals is detected through a video detecting device, and the video detecting device locks onto and tracks each individual by identifying physical features, such as facial features, or posture features, such as walking style. In an exemplary embodiment, the video detecting device is a camera. The individual can be a human, an animal, or an artificial entity, such as an artificial intelligence robot.

At block 102, voice information in the scene is recorded. The voice information is detected by a voice detecting device. In an exemplary embodiment, the voice detecting device is a microphone. The voice information in the scene comprises individual voices and combined voices.

At block 103, individual voices in the voice information are identified. The individual voices can be identified through sound frequency, posture change, such as opening mouth, or semantics.

At block 104, it is determined whether a target individual has a reply action responding to a trigger voice in the individual voices; if yes, perform block 105, if not, back to the block 101. The reply action can comprise at least one of head actions, facial actions, and hand actions. The head actions can comprise raise and swivel. The facial action can comprise mouth actions and eyes action. The hand action can be raising hand for example. The trigger voice can be using an individual's name, or nickname or pet name.

At block 105, the trigger voice is recorded.

At block 106, semantic of a plurality of trigger voices is analyzed.

At block 107, it is determined whether semantic usage among the plurality of trigger voices is more than a preset number; if yes, perform block 108, if not, back to the block 104.

At block 108, the trigger voice is associated with the target individual.

At block 109, the trigger voice is converted into a text and the text is associated with the target individual.

After the text is associated with the target individual, physical features, or facial features or posture features, such as walking style can be taken as sufficient for registration purposes, to replace manual registration. The text can also be used to associate with other data, such as occupational history, health state, and personal preferences, via big data analysis.

Figure 2:
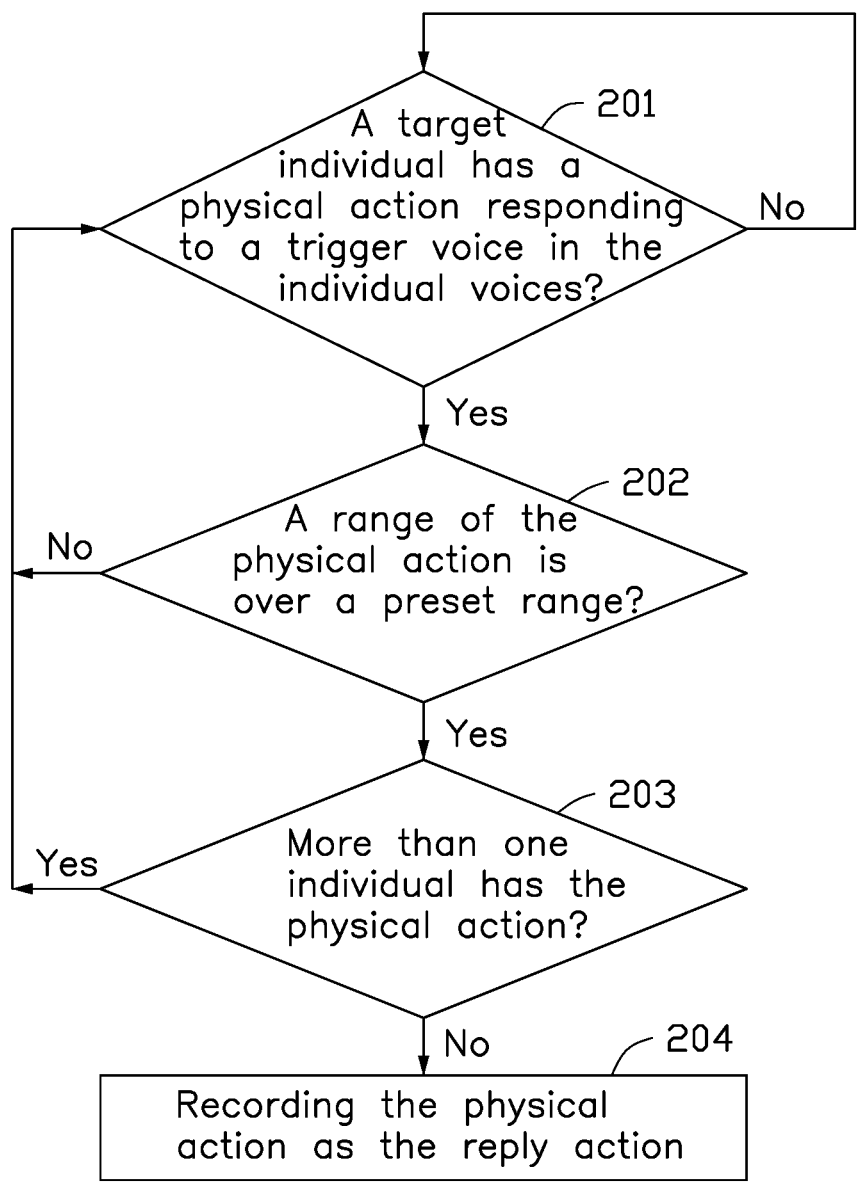
FIG. 2 is a flow diagram of an exemplary embodiment of determining an action from a target individual responding to a trigger voice in individual voices of the identity information matching method of FIG. 1.

FIG. 2 is a flowchart depicting an exemplary embodiment of the block 104. The block 104 can begin at block 201.

At block 201, it is determined whether a target individual has a physical action responding to one individual trigger voice; if yes, perform block 202, if not, continue to perform block 201. The physical action can comprise at least one of head actions, facial actions, and hand actions. The head actions can comprise raising and swivelling. The facial action can comprise mouth actions and eyes action. The hand action can be raising hand.

At block 202, it is determined whether a range of the physical actions is beyond a preset range; if yes, perform block 203, if not, back to the block 201.

At block 203, it is determined whether more than one individual has the physical action; if not, perform block 204, if yes, back to the block 201.

At block 204, the physical action is recorded as the reply action.

Figure 3:
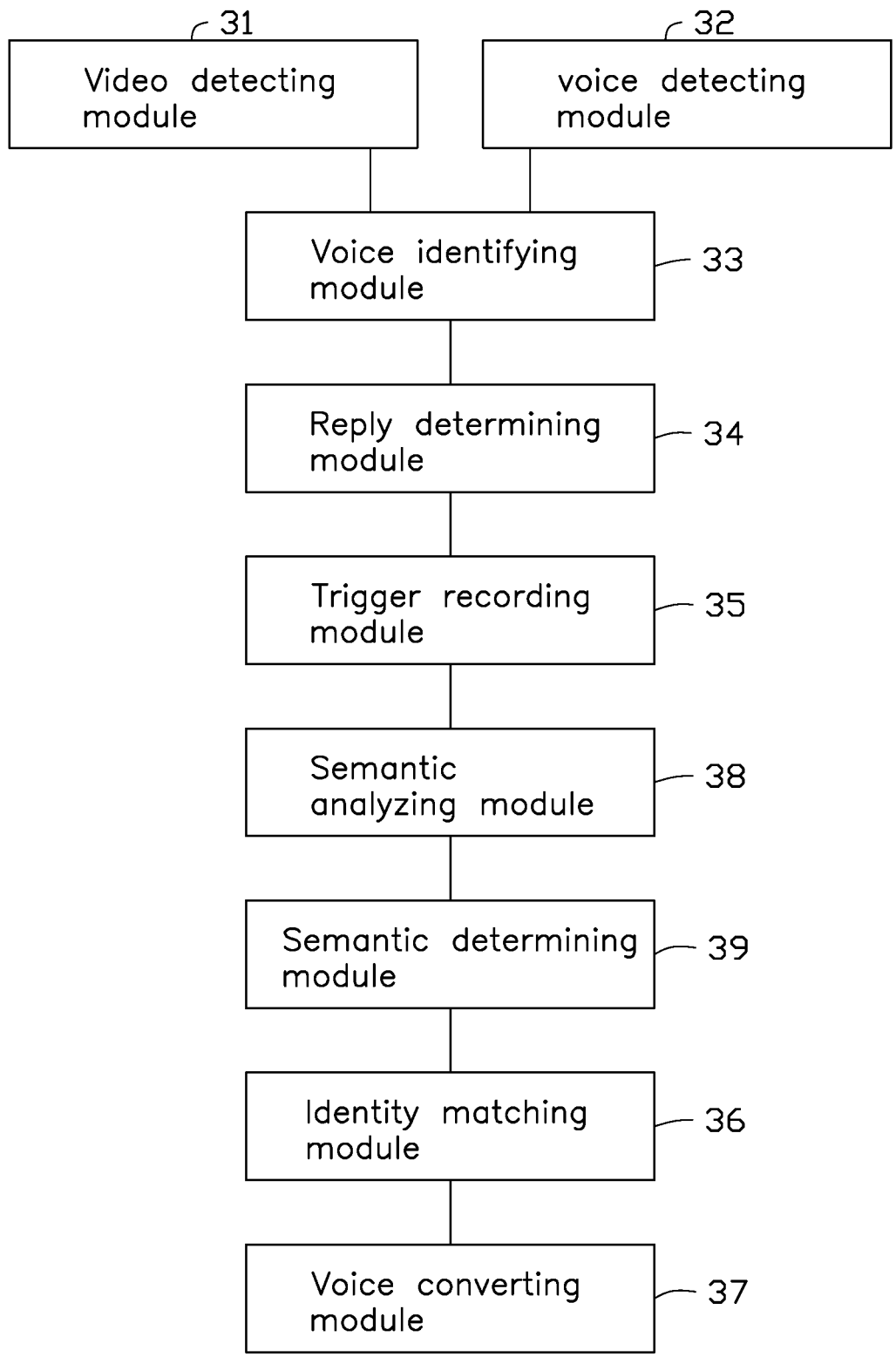
FIG. 3 is a block diagram of an exemplary embodiment of an identity information matching system.

FIG. 3 illustrates that the identity information system as an exemplary embodiment can comprise a video detecting module 31, a voice detecting module 32, a voice identifying module 33, a reply determining module 34, a trigger recording module 35, a semantic analyzing module 38, a semantic determining module 39, an identity matching module 36, and a voice converting module 37.

The video detecting module 31 detects a scene and identifies individuals in the scene. The scene is a fixed activity space, such as meeting room, super market, laboratory, classroom, dining room, and shopping mall. The video detecting device 31 locks onto and tracks each individual by identifying physical features, such as facial features, or posture features, such as walking style. In an exemplary embodiment, the video detecting device is a camera. The individual can be a human, an animal, or an artificial entity, such as an artificial intelligence robot.

The voice detecting module 32 records voice information in the scene. In an exemplary embodiment, the voice detecting device 32 is a microphone. The voice information in the scene comprises individual voices and combined voices.

The voice identifying module 33 identifies individual voices in the voice information. The individual voices can be identified through sound frequency, posture changes, such as opening mouth, or semantic usage.

The reply identifying module 34 determines whether a target individual has a reply action responding to a trigger voice emanating from the individual voices, by determining whether a target individual has a physical action responding to a trigger voice from the individual voices and determining whether a range of the physical action is beyond a preset range. The reply action can comprise at least one of head actions, facial actions, and hand actions. The head actions can comprise raising and swivelling. The facial action can comprise mouth actions and eyes action. The hand action can be raising of the hand. The trigger voice can be an individual's name being spoken, or nickname or pet name. When the range of the physical actions is small or more than one individual has same physical action, such physical action is not considered as a reply action.

The trigger recording module 35 records the trigger voice.

The semantic analyzing module 38 analyzes semantic usage of a plurality of trigger voices.

The semantic determining module 39 determines whether semantic usage among the plurality of trigger voices is more than a preset number. The preset number is two or more.

The identity matching module 36 associates the trigger voice with the target individual.

The voice converting module 37 converts the trigger voice into a text and associates the text with the target individual.

After association of the text with the target individual, physical features, such as facial features, or posture features, such as walking style is enabled as being sufficient for registration purposes, to replace manual registration. The text can also be used to associate with other data, such as occupational history, health state, and personal preferences, via big data analysis.

Figure 4:
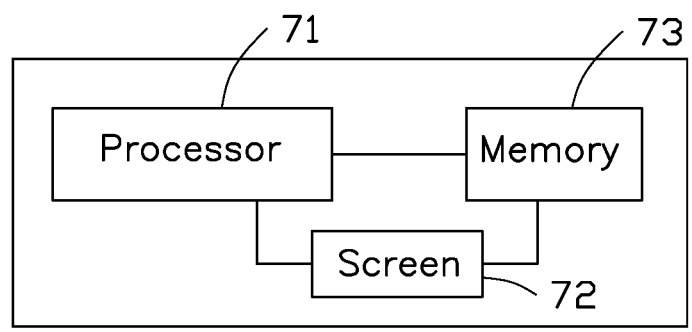
FIG. 4 is a block diagram of an exemplary embodiment of a user device in the system of FIG. 3.

FIG. 4 illustrates a user device in accordance with an exemplary embodiment. The user device can comprise a processor 71, a screen 72, and a memory 73. The screen 72 is configured to display the text messages and the voice messages after recognition. The processor 71 can call out programs stored in the memory 73, so as to perform the identifying information matching method.

The instructions stored as programs in the memory 73 can be part of other software or used as an independent product. The memory 73 can store software programs or routines, or computer-performable routines, such as the routines or modules corresponding to the identity information matching method disclosed in the exemplary embodiment. The processor 71 performs function application and data processing by operating the software routines, instructions, and modules.

The memory 73 can comprise programs and updatable data in storing areas. A storing area can store operating system and application routines. The memory 73 can comprise USB flash disk, mobile HDD, Read-Only Memory, Random Access Memory, diskette, and optical disk.

The processor 71 loads and executes at least one instruction to achieve blocks or steps of the identity information matching method of FIGS. 1-2. In a precise and complete implementation, the processor 71 can load at least one instruction to execute the method beginning at block 101.

At block 101, individuals in a scene are identified. The scene is a fixed activity space, such as meeting room, supermarket, laboratory, classroom, dining room, and shopping mall. The individuals is detected through a video detecting device, and the video detecting device locks onto and tracks each individual by identifying physical features, such as facial features, or posture features, such as walking style. In an exemplary embodiment, the video detecting device is a camera. The individual can be a human, an animal, or an artificial entity, such as an artificial intelligence robot.

At block 102, voice information in the scene is recorded. The voice information is detected by a voice detecting device. In an exemplary embodiment, the voice detecting device is a microphone. The voice information in the scene comprises individual voices and combined voices.

At block 103, individual voices in the voice information are identified. The individual voices can be identified through sound frequency, posture change, such as opening mouth, or semantics.

At block 104, it is determined whether a target individual has a reply action responding to a trigger voice in the individual voices; if yes, perform block 105, if not, back to the block 101. The reply action can comprise at least one of head actions, facial actions, and hand actions. The head actions can comprise raise and swivel. The facial action can comprise mouth actions and eyes action. The hand action can be raising hand for example. The trigger voice can be using an individual's name, or nickname or pet name.

At block 105, the trigger voice is recorded.

At block 106, semantic of a plurality of trigger voices is analyzed.

At block 107, it is determined whether semantic usage within the plurality of trigger voices is more than a preset number; if yes, perform block 108, if not, back to the block 104.

At block 108, the trigger voice is associated with the target individual.

At block 109, the trigger voice is converted into a text and the text is associated with the target individual.

After the text is associated with the target individual, physical features, such as facial features, or posture features, are enabled as being sufficient for registration purposes. The text can also be associated with other data, such as occupational history, health state, and personal preferences, via big data analysis.

An exemplary embodiment of the block 104 is shown in FIG. 2, which can begin at block 201.

At block 201, it is determined whether a target individual has a physical action responding to a trigger voice in the individual voices; if yes, perform block 202, if not, continue to perform block 201. The physical action can comprise at least one of head actions, facial actions, and hand actions. The head actions can comprise raising and swivelling head. The facial actions can comprise mouth actions and eyes action. The hand action can be raising a hand.

At block 202, it is determined whether a range of the physical actions is beyond a preset range; if yes, perform block 203, if not, back to the block 201.

At block 203, it is determined whether more than one individual has the same physical action; if not, perform block 204, if yes, back to the block 201.

At block 204, the physical action is recorded as the reply action.

The exemplary embodiments shown and described above are only examples. Many details are often found in the art such as the other features of identity information matching device and method. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. An identity information matching method comprising:
   identifying individuals in a scene;
   recording voice information in the scene;
   identifying individual voices in the voice information;
   determining whether a target individual has a reply action responding to a trigger voice in the individual voices;
   recording the trigger voice; and
   associating the trigger voice with the target individual;
   wherein a method of determining whether a target individual has a reply action responding to a trigger voice in the individual voices comprising:
   determining whether a target individual has a physical action responding to one trigger voice in the individual voices;
   determining whether a range of the physical actions is beyond a preset range; and
   determining whether more than one individual has the physical action simultaneously.

2. The identity information matching method of claim 1, wherein before the associating the trigger voice with the target individual, the method further comprising:
   analyzing semantic of a plurality of trigger voices; and
   determining whether semantic usage among the plurality of trigger voices is more than a preset number.

3. The identity information matching method of claim 1, wherein the physical action comprises at least one of head actions, facial actions, and hand actions, the head actions comprises raise and swivel; the facial action comprises mouth actions and eyes action; and the trigger voice is an appellation of the individual.

4. The identity information matching method of claim 1, wherein the identifying individuals in a scene comprises: locking and tracking each individual by identifying physical features or posture features of the individuals.

5. The identity information matching method of claim 1, wherein the identifying individual voices in the voice information comprises identifying the individual voices through sound frequency, posture change, or semantics.

6. The identity information matching method of claim 1, wherein further comprising:
   converting the trigger voice into a text and associating the text with the target individual.

7. An identity information matching system, comprising:
   a video detecting module, configured to identify individuals in a scene;
   a voice detecting module, configured to record voice information in the scene;
   a voice identifying module, configured to identify individual voices in the voice information;
   a reply determining module, configured to determine whether a target individual has a reply action responding to a trigger voice in the individual voices;
   a trigger recording module, configured to record the trigger voice; and
   an identity matching module, configured to associate the trigger voice with the target individual;
   wherein the reply identifying module is configured to determine whether a target individual has a physical action responding to a trigger voice in the individual voices; whether a range of the physical action is beyond a preset range; and whether more than one individual has the physical action simultaneously.

8. The identity information matching system of claim 7, wherein the system further comprising:
   a semantic analyzing module, configured to analyze semantic of a plurality of trigger voices; and
   a semantic determining module, configured to determine whether semantic usage among the plurality of trigger voices is more than a preset number.

9. The identity information matching system of claim 7, wherein the physical action comprises at least one of head actions, facial actions, and hand actions, the head actions comprises raise and swivel; the facial action comprises mouth actions and eyes action; and the trigger voice is an appellation of the individual.

10. The identity information matching system of claim 7, wherein the video detecting module is a camera and configured to lock and track each individual by identifying physical features or posture features of the individuals.

11. The identity information matching system of claim 7, wherein the voice identifying module is configured to identify the individual voices through sound frequency, posture change, or semantics.

12. The identity information matching system of claim 7, wherein the system further comprises a voice converting module, configured to convert the trigger voice into a text and associate the text with the target individual.

13. The identity information matching system of claim 7, wherein the voice detecting module is a microphone.

14. A user device, comprising:
   a processor, configured to perform one or more instructions; and a memory, configured to store a plurality of instructions, and the plurality of instructions is capable of being called out by the processor and configured to perform an identifying information matching method comprising:
identifying individuals in a scene;
recording voice information in the scene;
identifying individual voices in the voice information;
determining whether a target individual has a reply action responding to a trigger voice in the individual voices;
recording the trigger voice; and
associating the trigger voice with the target individual
wherein a method of determining whether a target individual has a reply action responding to a trigger voice in the individual voices comprising:
determining whether a target individual has a physical action responding to one trigger voice in the individual voices;
determining whether a range of the physical actions is beyond a preset range; and
determining whether more than one individual has the physical action simultaneously.

* * * * *